| (12) United States Patent | (10) Patent No.: US 8,559,065 B2 |
|---|---|
| Deamer | (45) Date of Patent: Oct. 15, 2013 |

(54) RETRACTABLE CALIBRATION STRIP FOR A DIGITAL PRINTER OR IMAGE SCANNER

(75) Inventor: John David Deamer, Essex (GB)

(73) Assignee: Xerox Corporation, Norwalk, CT (US)

( * ) Notice: Subject to any disclaimer, the term of this patent is extended or adjusted under 35 U.S.C. 154(b) by 266 days.

(21) Appl. No.: 13/216,982

(22) Filed: Aug. 24, 2011

(65) Prior Publication Data

US 2013/0050771 A1     Feb. 28, 2013

(51) Int. Cl.
    *H04N 1/46*     (2006.01)

(52) U.S. Cl.
    USPC .......................................... 358/448; 358/505

(58) Field of Classification Search
    None
    See application file for complete search history.

(56) References Cited

U.S. PATENT DOCUMENTS

| | | | |
|---|---|---|---|
| 5,280,368 A | 1/1994 | Fullerton | |
| 5,488,458 A | 1/1996 | Benedict et al. | |
| 6,195,159 B1 * | 2/2001 | MacDonald et al. | 356/123 |
| 6,198,536 B1 | 3/2001 | Baker | |
| 6,324,353 B1 | 11/2001 | Laussermair et al. | |
| 6,684,035 B2 | 1/2004 | Furno et al. | |
| 6,947,187 B2 | 9/2005 | Mui et al. | |
| 7,164,507 B2 | 1/2007 | Beck et al. | |
| 7,457,006 B2 | 11/2008 | Wilsher et al. | |
| 7,499,158 B2 | 3/2009 | Flemming et al. | |
| 2007/0070457 A1 * | 3/2007 | Cheng | 358/504 |

* cited by examiner

*Primary Examiner* — Benny Q Tieu
*Assistant Examiner* — Haris Sabah
(74) *Attorney, Agent, or Firm* — Ronald E. Prass, Jr.; Prass LLP

(57) ABSTRACT

According to aspects of the embodiments, there is provided an apparatus that includes a calibration member that is disposed within a calibration holder and is movable to a position within the optical path of the scanner head assembly. The apparatus can perform optical analysis of images on sheets, comprising a structure forming a baffle for passage of a sheet therethrough, and a photosensor disposed to receive light reflected from a sheet in the baffle. In particular, this embodiment employs a shutter plate mounted to a rack and pinion system where the shutter plate serves the dual purpose of presenting the calibration member to the scanner when engaged into the paper path and when retracted, the backside of the shutter serves as a paper guide.

20 Claims, 4 Drawing Sheets

RETRACTABLE CALIBRATION STRIP FOR A DIGITAL PRINTER OR IMAGE SCANNER

BACKGROUND

The present disclosure relates to digital printing apparatus, such as using xerographic or ink-jet technology, and carrying out image-quality tests therein. More particularly, it relates to an apparatus employing a shutter plate that offers protection from contamination and assist in guiding the paper through a structure such as baffle.

Image-capturing peripherals such as scanners have become increasingly useful, affordable and common devices for homes and businesses. These devices are useful for capturing and storing images such as text, graphic or pictorial images contained on documents. Various types of scanners include flatbed, drum and handheld scanners. With a flatbed scanner, one of the most common types of scanners, a document to be scanned is typically placed onto a transparent glass platen of the scanner, where a scanner head assembly (also referred to as a carriage assembly) moves to capture the image contained on the document. The image in digital form is often transmitted to a connected computer such as a database hosted by a server, though it may instead be stored within the scanner, or transmitted directly to another peripheral such as a printer or facsimile (fax) machine.

It is common to require occasional "calibration" of the printer especially in color printing using digital printers. Generally this is done by causing the printer to output sheets bearing a series of "test patches," each patch representing a desired color. The test patches are then read by a spectrophotometer or similar image sensor, and the actual reflectance values of the patches are compared to the colors of the desired patches. In a high-speed, production context, it is known to provide image sensors immediately downstream of a printing apparatus for various purposes, as shown in U.S. Pat. Nos. 5,488,458; 6,324,353; and 6,684,035.

In practical operation, an image sensor used in combination with a printer must itself be calibrated occasionally. Sensor calibration usually involves exposing to the sensor a surface of known predetermined optical properties, such as a predetermined blackness or whiteness, and then adjusting the outputs of the image sensor accordingly. U.S. Pat. No. 6,198,536 shows a sheet scanner in which calibration targets can be slid underneath a spectrophotometer: a user manually slides the desired black or white calibration "backer" underneath the spectrophotometer as needed.

However, conventional systems tend to add contaminants on the calibration strip causing a less than optimal calibration. Poor calibration results in the quality of the output copy being unacceptable due to the system or machine software misinterpreting the reflected light and wrongly adjusting the print output. Various techniques have been adopted to remove the contaminants from the calibration strip such as the use of cleaning blades. Cleaning blades introduce problems such as scratching, warping, and the introduction of streaks on the calibration strip. To ensure repeatability of reflected light back into the scan unit during calibration the calibration strip must be prevented from being marked, blemished, scratched and scuffed. Failure to meet these criteria will result in the quality of the output copy being unacceptable due to the system or machine software misinterpreting the reflected light and wrongly adjusting the print output.

The present disclosure, in various embodiments, is directed to a system useful in calibrating image sensors, whether as part of a testing station downstream of a printing apparatus, within a scanner for recording hard-copy images, or for any other purpose.

SUMMARY

According to aspects of the embodiments, there is provided an apparatus that includes a calibration member that is disposed within a calibration holder and is movable to a position within the optical path of the scanner head assembly. The apparatus can perform optical analysis of images on sheets, comprising a structure forming a baffle for passage of a sheet therethrough, and a photosensor disposed to receive light reflected from a sheet in the baffle. In particular, this embodiment employs a shutter plate mounted to a rack and pinion system where the shutter plate serves the dual purpose of presenting the calibration member to the scanner when engaged into the paper path and when retracted, the backside of the shutter serves as a paper guide.

DETAILED DESCRIPTION

Figure 1:
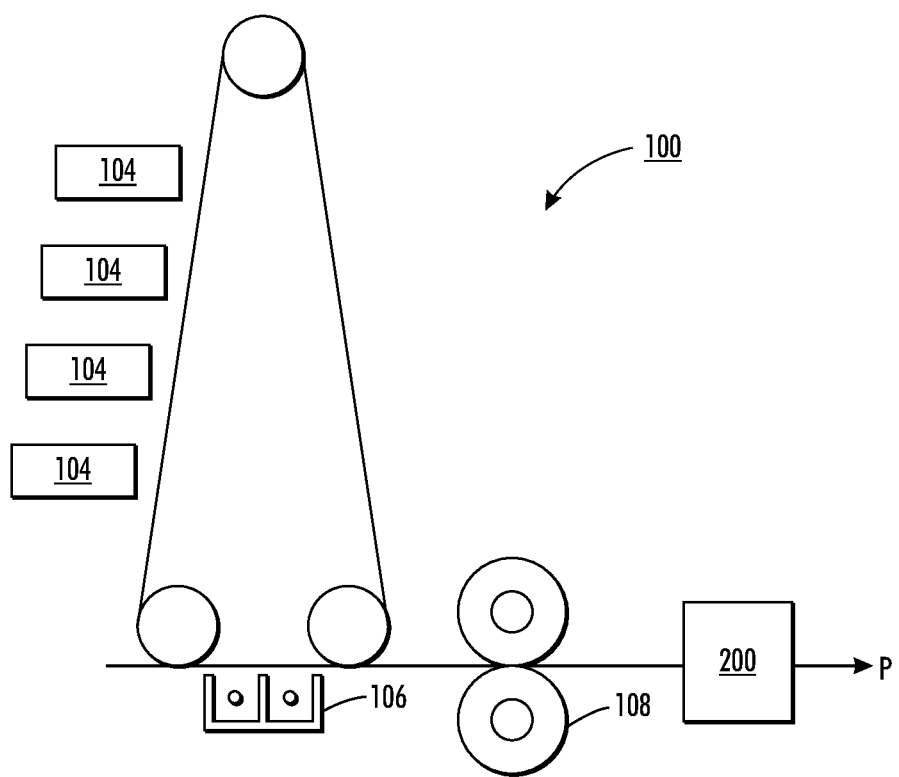
FIG. 1 is a simplified elevational view of a printing apparatus with a testing station associated therewith in accordance to an embodiment.

In accordance with various aspects described herein, an apparatus for optical analysis of images on sheets where a scanner calibration strip can be moved from a parked position outside of the paper path to a position in the paper path and under the scan head. In particular, the disclosed embodiments employ a shutter plate mounted to a rack and pinion system where the shutter serves the dual purpose of presenting the calibration strip to the scanner when engaged into the paper path and when retracted, the backside of the shutter serves as a paper guide. This method is advantageous, because in the retracted state the calibration strip can sealed in order to prevent contamination from paper dust and the like.

Aspects of the disclosed embodiments relate to an apparatus for optical analysis of images on sheets comprising a structure forming a baffle for passage of a sheet therethrough, wherein the baffle has an aperture to allow a slidable calibration strip holder in to the passage; a photosensor disposed to receive light reflected from an object in the baffle; a slidable calibration strip holder having a first target surface associated therewith and a side which serves as a guide for passage of a sheet through the baffle, wherein the slidable calibration strip holder can position the first target surface adjacent to the photosensor and can position the first target surface outside the passage; a calibration member on the first target surface having a reference reflectivity, the calibration member lying outside the passage when the slidable calibration strip holder serves as a guide for passage of a sheet through the baffle.

Aspects of the disclosed embodiments relate to an apparatus for recording images on sheets comprising a light-transmissive platen, defining a top surface and a bottom surface; a structure forming a baffle for passage of a sheet below the platen, wherein the baffle has an aperture to allow a slidable calibration strip holder into the passage; a photosensor disposed above the platen to receive light reflected from a sheet in the baffle; a calibration strip holder disposed below the platen and movable parallel to the bottom surface of the platen, the calibration strip holder having disposed thereon a member defining a calibration surface; a calibration member on the calibration surface having a reference reflectivity, the calibration surface lying outside the passage when the slidable calibration strip holder is in a home position.

Aspects of the disclosed embodiments relate to an apparatus for calibrating an image-capturing device of the type which includes a document feeder having a baffle with passageway for feeding paper in a designated paper path, the feeder being connected to a photosensor to receive light reflected from a sheet in the baffle comprising a calibration strip holder connected to a fixed central axis for reciprocating motion between a first position and a second position within the passageway; a baffle aperture to permit entry of the calibration strip holder into the passageway and exit of the calibration strip holder from the passageway, wherein a side of the calibration strip holder when in the first position serves as a paper guide for passage of a sheet through the baffle; a calibration strip attached to a target surface of the calibration strip holder such that when the calibration strip holder is in the second position the calibration strip is in an optical path of the photosensor in a first designated location, the calibration strip being adapted to calibrate an image-capturing device when scanned by the photosensor; and, a motor pinion in abutting engagement with the calibration strip holder for urging the calibration strip holder to translate into the first or second position, the motor pinion being positioned outside the passageway.

In yet further aspects of the disclosed embodiments relate to an apparatus wherein the target surface comprise a three-dimensional structure having substantially planar and parallel trough and mesa surfaces.

Further aspects of the disclosed embodiments relate to an apparatus wherein the calibration strip is placed in the trough surface.

Further aspects of the disclosed embodiments relate to an apparatus wherein the calibration strip holder has a distinctly-angled face for guiding the paper passing through the baffle.

Further aspects of the disclosed embodiments relate to an apparatus wherein the calibration strip comprises an opaque reflective film.

Further aspects of the disclosed embodiments relate to an apparatus wherein the calibration strip comprises reflective paint covered by a layer of at least partially transparent film.

The term "print media" generally refers to a usually flexible, sometimes curled, physical sheet of paper, calibration strip, plastic, or other suitable physical print media substrate for images.

The term "image forming machine" as used herein refers to a digital copier or printer, electrographic printer, xerographic printer, bookmaking machine, facsimile machine, scanner, digital printer, multi-function machine, or the like and can include several marking engines, as well as other print media processing units, such as paper feeders, finishers, and the like.

As used herein relational terms such as "first," "second," and the like may be used solely to distinguish one entity or action from another entity or action without necessarily requiring or implying any actual such relationship or order between such entities or actions. Also, relational terms, such as "offset", "upstream", "downstream", "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

FIG. 1 is a simplified elevational view of a printing apparatus, in this case a production-speed xerographic printer. The print engine 100 is of a type generally familiar in the art: a photoreceptor 102 rotates past imaging stations 104, one imaging station for each CMYK primary color, and each including (not shown) a charge device, laser, and development unit. Each imaging station, controlled by digital data supplied thereto, places toner according to a color separation of a desired image on the photoreceptor 102, and the total color image is then transferred to a print sheet at transfer station 106. The print sheet then moves in a process direction P through a fusing station 108, and continues, at a constant velocity, past what can be called a "testing station" 200. Testing station 200 is positioned to read at least a strip of each sheet substantially immediately following fusing, fusing being considered in this embodiment the end of the printing process. Testing station 200 could be used as a scanner, at the front end of print engine 100, to acquire images to be stored or reproduced from image bearing sheets that move past one or more image sensors analogous to the photosensor 204 described above. An exemplary scanner is disclosed in U.S. Pat. No. 7,164,507 (Beck et al), which is incorporated herein by reference in its entirety.

Figure 2:
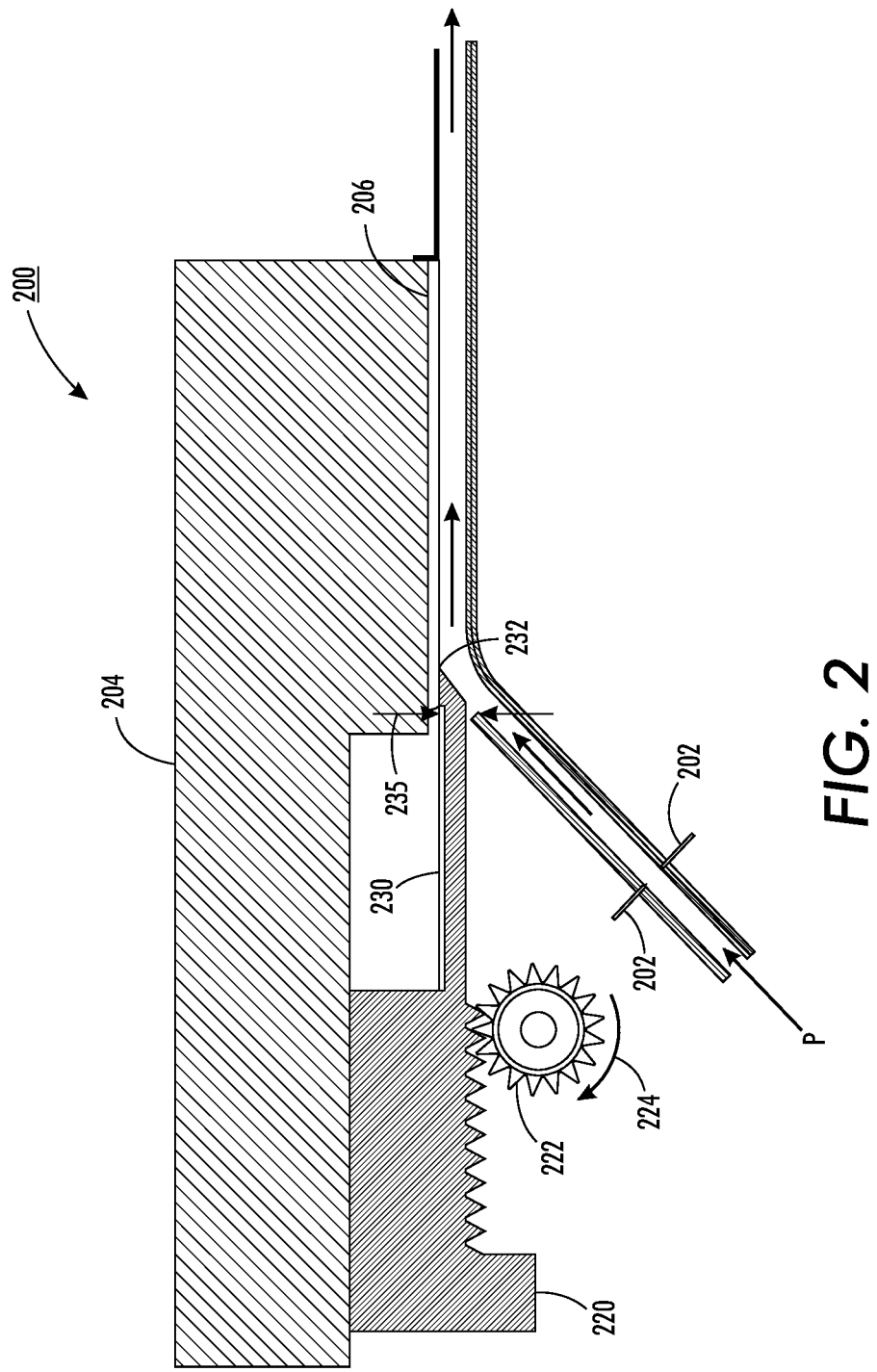
FIG. 2 is a detailed elevational view of the testing station for use in printing apparatus in accordance to an embodiment.

FIG. 2 is a detailed elevational view of the testing station 200 for use in printing apparatus in accordance to an embodiment. Around the testing station 200 includes a structure 202, such as forming two opposing surfaces, forming a baffle through which a sheet emerging from fuser 108 can pass. Associated with one surface of the baffle is a photosensor 204, which may relate to a spectrophotometer or any other kind of optical detector. The photosensor 204, which may be associated with a light source (not shown), receives reflected light for various purposes from objects such as sheets moving past a light-transmissive platen 206. Outside the baffle in the embodiment is a selectably positionable "target member," generally indicated as 230. The member 230 is encased, is resting on, or is affixed to a surface such as a shutter plate on the slidable calibration strip holder 220. The surface serves the dual purpose of presenting the target member 230 to the photosensor 204 when engaged into the paper path or passageway and because of backside 232 to serve as a paper guide. The calibration strip holder 220 is mounted to a rack and pinion system or the like. The rack and pinion system uses an actuator 222 to cause a rotation around axis 224. An aperture 235 on the sidewall of the baffle allows entry of the shutter plate into the passageway so that target member 230 could be scanned by photosensor 204. The target member 230 can extend a small distance or across an entire width of the scan beam created by photosensor 204. The target member 230 is a calibration strip made from an opaque reflective film or painted strips and the like, which is covered with a protective plastic coating, and which comprises an ultra high molecular weight polyethylene film member secured over painted calibration strip by a self-adhesive layer.

The actuator 222 rotates and drives a rack that is either fully located or integral to the calibration strip holder 220. The actuator 222 may be any device that can move the calibration strip holder 220. For example, the actuator may include a motor. The motor may be a stepper motor with rack and pinion design. In alternative embodiments, the actuator 222 can include a solenoid. The actuator 222 may be associated with a monitoring device (not shown) that monitors the movement of the holder in the baffle. In general, the holder is moved from a first position farthest to a sensing window in the baffle before the start of the calibration process, to subsequent positions progressively farther into the baffle as the calibration process progresses.

The calibration strip holder 220 is driven from a home position (as shown in the figure) to a surface adjacent to the photosensor inside the baffle and through an aperture 235 in the paper path side wall. In normal operation the tip of the paper must never cause a sheet to stub against the shutter plate, a side of the calibration holder is manufacture to fit and function as part of the baffle wall. As shown the backside 232 has a distinctly-angled face for guiding the sheet passing through the baffle. The surface of the calibration strip holder 220 that is closes or in contact with the glass is slightly higher than the top face where the target member 230 is held to prevent marking or abrasion. The part of the holder where the target member is located comprises a three-dimensional structure having substantially planar and parallel trough and mesa surfaces. The target member or calibration strip is found in the trough surface protected from abrasions and debris. When the calibration strip is within the scan beam calibration can commence. Since the holder has movement the calibration could be either moving calibration or stationary calibration. Once calibration is complete then the holder can be returned to its home position outside the passageway or outside the inner part of the baffle.

Figure 3:
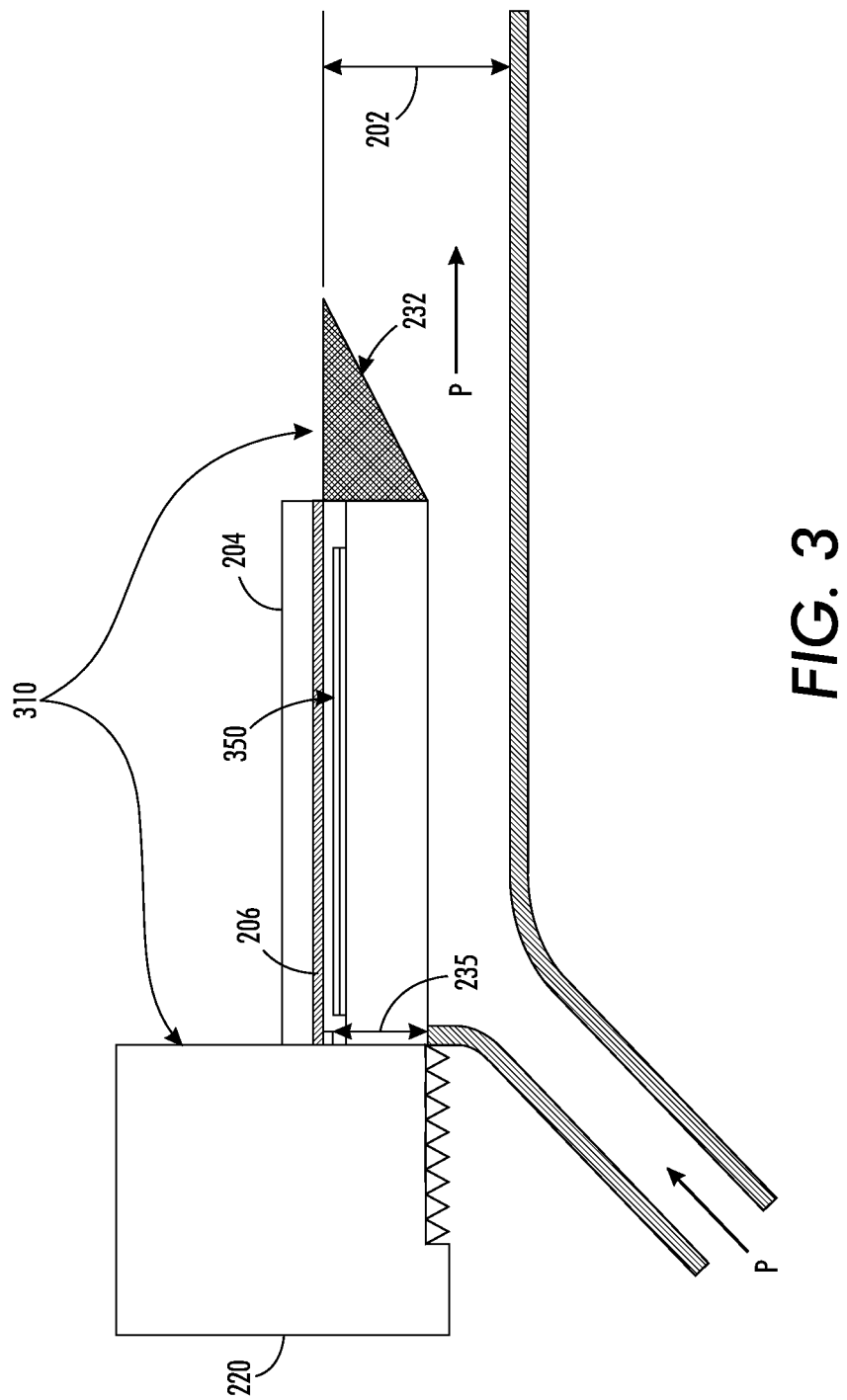
FIG. 3 is a detailed elevational view of the testing station with a calibration member in the scan position in accordance to an embodiment.

FIG. 3 is a detailed elevational view of the testing station with a calibration member in the scan position in accordance to an embodiment. The calibration member 350 is shown adjacent to photosensor 204 or within the scan beam after it passes through platen 206. Part of the calibration holder 220 is within the passageway of structure 202. One of the mesa surfaces 310 fits somewhat tight to the wall of the structure to prevent contamination of calibration member 350. The calibration member 350 is affixed or placed on the trough surface 330 to prevent ripping or abrasions.

Figure 4:
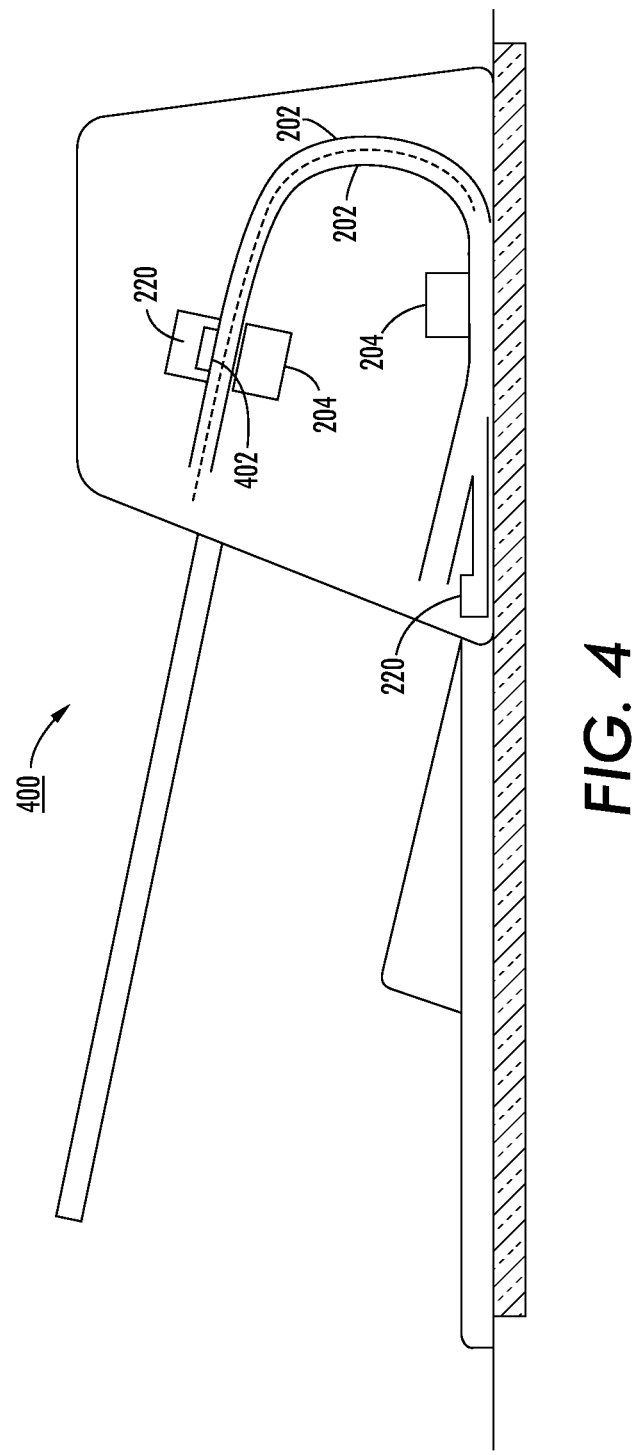
FIG. 4 is a simple elevational diagram of an image scanner with a calibration strip holder associated therewith in accordance to an embodiment.

FIG. 4 is a simple elevational diagram of an image scanner 400 with a calibration strip holder associated therewith in accordance to an embodiment. In brief, image scanner 400 causes sheets bearing images to be recorded to move past one or more image sensors analogous to the photosensor 204 described above; in a practical application the each image sensor 204 effectively extends, possibly with associated optics, the width of a sheet moving in process direction P. Adjacent each image sensor 204 is a baffle 202 and target member when moved by calibration strip holder 220, as described above. The target members 230 can be positioned as desired to assist in calibrating the respective associated image sensors 204. As noted above a backside 402 (232 in FIG. 2) of the calibration strip holder 220 serves as a paper guide.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

It is believed that the foregoing description is sufficient for purposes of the present application to illustrate the general operation of an electrophotographic printing machine. Moreover, while the present invention is described in an embodiment of a single color printing system, there is no intent to limit it to such an embodiment. On the contrary, the present invention is intended for use in multi-color printing systems as well or any other printing system having a cleaner blade and toner. It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the followings claims.

What is claimed is:

1. An apparatus for optical analysis of images on sheets, comprising:
   a structure forming a baffle for passage of a sheet therethrough, wherein the baffle has an aperture to allow a slidable calibration strip holder in to the passage;
   a photosensor disposed to receive light reflected from an object in the baffle;
   the slidable calibration strip holder having a target surface associated therewith and a side which serves as a guide for the passage of the sheet through the baffle, wherein the slidable calibration strip holder position the target surface adjacent to the photosensor and position the target surface outside the passage;
   a calibration member on the target surface having a reference reflectivity, the calibration member lying outside the passage when the slidable calibration strip holder serves as the guide for passage of the sheet through the baffle.

2. The apparatus according to claim 1, wherein the target surface comprise a three-dimensional structure having substantially planar and parallel trough and mesa surfaces.

3. The apparatus according to claim 2, wherein the calibration member is placed in the trough surface.

4. The apparatus according to claim 3, wherein the slidable calibration strip holder has a distinctly-angled face for guiding the sheet passing through the baffle.

5. The apparatus according to claim 3, further comprising:
   a transport mechanism with motor and pinion gear to position the slidable calibration strip holder in a calibration position or home position where the slidable calibration strip holder serves as the sheet guide for the passage of the sheet through the baffle.

6. The apparatus according to claim 5, wherein the calibration member comprises an opaque reflective film.

7. The apparatus according to claim 5, wherein the calibration member comprises reflective paint covered by a layer of at least partially transparent film.

8. An apparatus for recording images on sheets, comprising:
   a light-transmissive platen, defining a top surface and a bottom surface;
   a structure forming a baffle for passage of a sheet below the platen, wherein the baffle has an aperture to allow a slidable calibration strip holder into the passage;
   a photosensor disposed above the platen to receive light reflected from inside the baffle;

the calibration strip holder disposed below the platen and movable parallel to the bottom surface of the platen, the calibration strip holder having a shutter plate with a calibration surface disposed thereon;

a calibration member on the calibration surface having a reference reflectivity, the calibration surface lying outside the passage when the shutter plate is in a home position.

9. The apparatus according to claim 8, wherein the shutter plate comprise a three-dimensional structure having substantially planar and parallel trough and mesa surfaces.

10. The apparatus according to claim 9, wherein the calibration member is placed in the trough surface.

11. The apparatus according to claim 10, wherein the shutter plate has a distinctly-angled face for guiding the sheet passing through the baffle.

12. The apparatus according to claim 11, further comprising: a transport mechanism with motor and pinion gear to position the shutter plate in a calibration position or in the home position where the shutter plate serves as a sheet guide for the passage of the sheet through the baffle.

13. The apparatus according to claim 12, wherein the calibration member comprises an opaque reflective film.

14. The apparatus according to claim 12, wherein the calibration member comprises reflective paint covered by a layer of at least partially transparent film.

15. An apparatus for calibrating an image-capturing device of type which includes a document feeder having a baffle with passageway for feeding paper in a designated paper path, the feeder being connected to a photosensor to receive light reflected from inside the baffle, the apparatus comprising:

a calibration strip holder connected to a fixed central axis for reciprocating motion between a first position and a second position within the passageway;

a baffle aperture to permit entry of the calibration strip holder into the passageway and exit of the calibration strip holder from the passageway, wherein a side of the calibration strip holder when in the first position serves as a paper guide for passage of a sheet through the baffle;

a calibration strip attached to a target surface of the calibration strip holder such that when the calibration strip holder is in the second position the calibration strip is in an optical path of the photosensor in a first designated location, the calibration strip being adapted to calibrate the image-capturing device when scanned by the photosensor; and, a motor pinion in abutting engagement with the calibration strip holder for urging the calibration strip holder to translate into the first or second position, the motor pinion being positioned outside the passageway.

16. The apparatus according to claim 15, wherein the target surface comprise a three-dimensional structure having substantially planar and parallel trough and mesa surfaces.

17. The apparatus according to claim 16, wherein the calibration strip is placed in the trough surface.

18. The apparatus according to claim 17, wherein the calibration strip holder has a distinctly-angled face for guiding the paper passing through the baffle.

19. The apparatus according to claim 18, wherein the calibration strip comprises an opaque reflective film.

20. The apparatus according to claim 18, wherein the calibration strip comprises reflective paint covered by a layer of at least partially transparent film.

* * * * *